Figure 1:
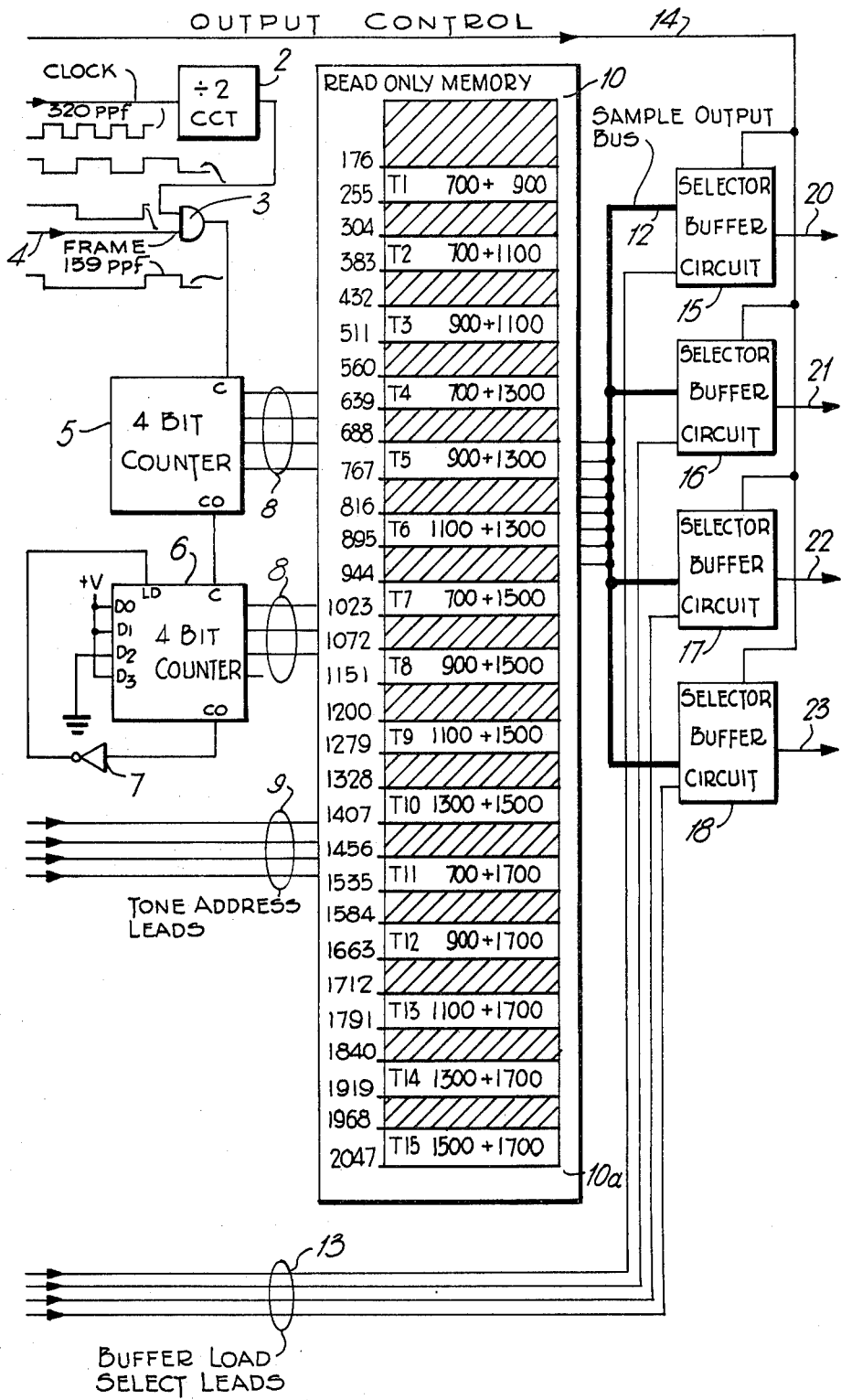

United States Patent [19]

Munter

[11] 4,227,248

[45] Oct. 7, 1980

[54] PCM TONE SIGNAL GENERATOR

[75] Inventor: Ernst A. Munter, Ottawa, Canada

[73] Assignee: Northern Telecom Limited, Montreal, Canada

[21] Appl. No.: 26,790

[22] Filed: Apr. 3, 1979

[30] Foreign Application Priority Data

Mar. 1, 1979 [CA] Canada .................................. 322547

[51] Int. Cl.$^3$ ............................................. H04J 3/12
[52] U.S. Cl. ............................ 370/110; 179/84 VF; 370/6; 328/14; 364/721
[58] Field of Search .................... 179/15 BY, 15 BF, 179/84 VF, 15 AN; 328/14; 84/1.01; 364/607, 721; 370/110, 13, 6

[56] References Cited

U.S. PATENT DOCUMENTS

| | | | |
|---|---|---|---|
| 3,985,965 | 10/1976 | Field et al. ...................... | 179/84 VF |
| 4,017,693 | 4/1977 | Roche et al. ..................... | 179/84 VF |
| 4,058,805 | 11/1977 | Lake ...................................... | 328/14 |
| 4,110,562 | 8/1978 | Moed .............................. | 179/15 BY |

OTHER PUBLICATIONS

"The Concept of an Improved Digital MFC Generator" by Mazzaferri in *Australian Telecommunication Research*, vol. 10, No. 2, pp. 38–49, 1976.

*Primary Examiner*—Douglas W. Olms
*Attorney, Agent, or Firm*—Frank P. Turpin

[57] ABSTRACT

A digital tone signal generator supplies PCM sample sequences of various signalling tones to TDM channels in an associated switching facility to accommodate signalling requirements. The phase of any one tone supplied to various channels is essentially different to minimize crosstalk in telephone network transmission facilities. The tone signal generator includes an address sequencer for generating a repetitive series of addresses. Each repetition preferably includes more addresses than channel occurrences per frame, the number of addresses corresponding to a dividend yielding other than a whole number quotient with a divisor corresponding to the number of samples in the tone sample sequence and integer submultiples of same other than 1. A memory responsive to the addresses includes the samples of the tone sample sequence stored at address accessible locations. The samples are stored in such order that occurrences of the addresses cause the memory to read out samples in the order of the tone sample sequence progressively with each occurrence of a given TDM channel.

10 Claims, 1 Drawing Figure

PCM TONE SIGNAL GENERATOR

The invention relates generally to telephone tone signalling generators and more particularly to a digital tone generator for use in a TDM system.

In a telephone network, various machine generated voice frequency signals are transmitted between switching facilities and from time to to time to various of the subscribers connected with the telephone network. The majority of these signals are usually of a single or multiple frequency tone signal type with the remainder being recorded voice announcements. Usually the tone signals are provided for one of two functions; (1) audible tone signals, for example dial tone, intended for human reception, and (2) tone signals for example indicating digits or supervision, intended for machine reception and recognition.

In a digital switching facility, the required tone signals can be generated by one or more analogue signal sources and then encoded to provide digital signals, or these tones can be generated directly as digital tone signals by one or more digital signal sources. Typically, a multitude of different digital tone signals are provided by a single digital tone signal generator. These signals can be presented in a space division format with each signal sample persisting throughout the period of each TDM frame, or in a time division format with the various tone signals each being assigned a dedicated TDM channel, or in a combination of two formats. In any case, the associated switching facility from time to time directs the required signalling from the output of the digital signal source to designated communication paths in the telephone network. When an analogue transmission facility forms part of the communication path, the digital tone signalling is converted to voice frequency analogue signals before being applied to the analogue facility. One example of an analogue facility is a cable including many twisted wire pair communication circuits. In the cable, there is always a degree of interference due to a circuit picking up unwanted signals from adjacent circuits. This is generally termed crosstalk. In the case of signalling generated from a single source, a plurality of analogue circuits simultaneously carrying the same signalling aggravate this problem of crosstalk relative to other analogue circuits in the cable.

One solution to this problem is to use a great many signalling sources so that each one of the signalling signals will be randomly phased with respect to the others and thereby prevent serious aggravation of the crosstalk problem. This solution however is quite expensive in terms of hardware, space and power consumption.

A digital tone signal generator in accordance with the invention generates a tone signal for TDM communication channels in an associated switching facility. The signal generator includes a memory having digital signal samples representing the tone signal stored therein at accessible locations. An access means, responsive to timing signals corresponding to the operating format of the switching facility, causes the memory to read out digital signal samples representing at least two different phases of the tone signal during the period of a frame in the operating format.

In a typical arrangement the access means includes an address generator for generating addresses in a repetitive sequence. A plurality of the addresses is generated during the period of each frame such that the plurality corresponds in number to a dividend yielding other than a whole number quotient with a given divisor corresponding to the number of the digital signal samples and submultiples of same other than 1.

In an expanded embodiment, the memory stores PCM signal samples representing a plurality of PCM tone signals. The memory is also responsive to addresses from the associated switching facility whereby one of the plurality of the PCM tone signals is selected.

In the case where tone samples for standard North American multifrequency signalling are required, each tone is represented by an eighty sample sequence stored in the ROM. To supply samples of a tone to one or two highways, an address sequence generator is driven by pulses of a bit rate clock signal from the switching facility. In a TDM system wherein each frame has 32 channels of 10 bits apiece, the bit rate clock signal consists of $10 \times 32 = 320$ pulses per frame (ppf). This permits the address sequence generator to traverse the address range of the tone up to four times per frame. However, as only on traverse $\pm$ one sample is required, the 320 ppf may also be divided by two or divided by four with the resultant pulses used to drive the address sequence generator. In any case, the number of drive pulses available per frame must yield other than a whole number quotient when divided by the number of samples in the sample sequence of the tone signal and integer submultiples of same other than 1. In this example, each assertion of a frame signal occurs during the period of a channel not used for voice band communication. The frame signal is conveniently used to delete one of the drive pulses. This causes the tone sample sequence relative to any one channel to be progressed through in the reverse direction; however, the direction of the progression is of no consequence.

In the case where three or four highways of thirty voice band channels each are supplied with tone signalling, the sequence is preferably traversed more than one per frame occurrence. As there are more channels than samples in the sequence, some of the channels are supplied with tone signals of the same phase; however the occurrences of these pairs of channels requiring the same tone at the same moment is infrequent and therefore contribute minimally to crosstalk.

The invention also provides a method for generating a tone signal having at least two phases and being compatible with the timing of a frame and channel operating format in an associated switching facility in a communication system. The method includes the steps of; accessibly storing digital signal samples capable of representing the tone signal; accessing ones of the stored digital signal samples which represent at least two different phases of the tone signal in response to timing signals corresponding to the timing of the operating format; and reading out the accessed samples during the period of a frame occurrence in the operating format.

The step of accessing ones of the stored digital signal samples is characterized in one embodiment by generating addresses in a sequence of addresses in response to the timing signals, wherein a plurality of the addresses is generated during the period of a frame occurrence in the operating format, such that the plurality of addresses corresponds in number to a dividend yielding other than a whole number quotient with a given divisor corresponding to the number of digital samples and submultiples of same other than 1.

An example embodiment of a digital PCM tone signal generator will now be described with reference to the accompanying drawing in which FIG. 1 is a block schematic diagram of a PCM tone signal generator for generating multiple frequency signalling in accordance with the invention.

In the PCM tone signal generator of FIG. 1, the leads shown entering the generator from the left hand side of the drawing are for connection with a control unit in an associated TDM PCM switching facility which is not shown. All the leads shown existing from the generator toward the right hand side of the drawing are for connection to a transmission switching network in the TDM PCM switching facility. The transmission switching network provides at least four highways of thirty two TDM channels of which thirty of the TDM channels are for voice band communication. Each channel carries 10-bit bytes repeating at an 8 KHz frame rate. The timing of the bits is represented by a clock signal consisting of 320 clock pulses per frame.

The PCM tone signal generator includes a read only memory (ROM) 10 with associated address circuitry and associated output circuitry. Samples of fifteen multifrequency signalling tones T1–T15 are stored at address accessible locations in the ROM 10, as illustrated in a memory organization table 10a. Each tone consists of two frequencies which are indicated in hertz and is represented by eighty samples of eight bits each. The samples of each tone are stored at address locations within address ranges as indicated at the left side of the table 10a. Cross-hatched portions of the table 10a indicate areas of the ROM 10 which are not used. In this arrangement the standard multifrequency signalling tones T1–T15 are conveniently stored in a single ROM having 2048 addressable storage locations each having an eight bit storage capacity.

In operation, the clock signal is received from the switching facility by a divide by two circuit 2 via a clock lead. The divide by two circuit 2 generates clock pulses occurring at a 160 ppf repetition rate. A frame signal received from the switching facility on a lead 4 includes a low signal state which occurs once in 320 of the pulses in the clock signal and with a duration of twice the period of the clock signal. The frame signal is ANDed with the 160 ppf clock pulses in an AND gate 3 to generate a clock pulse stream of 159 ppf. A counter circuit is provided by first and second four bit counters 5 and 6. The first four bit counter 5 counts the pulses on the 159 ppf pulse stream to generate the four least significant address bits of a sample address sequence. The second four bit counter 6 is connected to the carry output CO of the first counter 5. The second counter 6 counts assertions at the carry output CO of the first counter 5 to generate the three most significant bits of the sample address sequence. The second counter 6 includes data inputs D0, D1 and D3 connected to a positive potential +V and a data input D2 connected to ground. A carry output CO is connected via an inverter 7 to a load input LD of the second counter 6. When the counter reaches a full count of 255 the carry output of the counter 6 is asserted, causing the counter 6 to receive a load signal via the inverter 7 at its load input LD. This causes the counter 6 to be initialized according to the state of its data inputs D0–D3. At the same moment, the output of the first counter 5 changes from all ONES to all ZEROS. The counter thus generates a series of eighty addresses in an address range of 176 to 255.

As the counters 5 and 6 in the address circuitry count 159 pulses per frame the address range is traversed twice minus one address during each frame occurrence. This causes the ROM 10 to sequentially present 159 tone sample read-outs on an eight lead sample output bus 12 in the period between every pair of frame pulses. The particular one of the tones T1–T15 being accessed at any instant in time is determined by an address from the associated switching facility conducted via leads 9 to the most significant address inputs of the ROM 10. Each sample from the ROM 10 is presented via the sample output bus 12 to the inputs of four selector buffer circuits 15–18 each of which has an eight bit register. During the time of a channel period, up to four of the samples are received by the selector buffer circuits 15–18. Each of the selector buffer circuits 15–18 registers the output of the ROM 10 in response to an associated one of four buffer load select leads 13 being asserted. Each selector buffer circuit 15–18 outputs a sample of eight bits on an associated one of four PCM signal highways 20–23 under the control of signals from the associated switching facility, carried on an output control lead 14.

In the operation of this particular embodiment a given tone sample will from time to time be supplied to two different TDM channels occurring in the period of a given frame occurrence. This overlap occurs because each of the multifrequency tones T1–T15 is represented by only 80 samples while there are 120 channels for which tone samples are supplied. Thus relative to a given tone, samples of the tone are shared by some of the 120 TDM voice band channels. However the consequence of this in related analogue facility crosstalk is insignificant as compared to a situation wherein for example all of the 120 TDM channels are supplied in phase.

Audible tones, for example audible ringing, busy tone, and dial tone, required for subscriber loop signalling are generated by a signal generator similar to that illustrated in FIG. 1. The 2048 byte ROM in this case is organized as illustrated in the following ROM organization table to accommodate address circuitry conveniently constructed from "off-the-shelf" circuits.

| Address Ranges | Audible Tone |
|---|---|
| 56–255 | Audible Ringing |
| 312–511 | 440 Hz and 480 Hz |
| 568–767 | Busy Tone |
| 824–1023 | 480 Hz and 620 Hz |
| 1080–1279 | Dial Tone |
| 1336–1535 | |
| 1592–1791 | 350 Hz and 440 Hz |
| 1848–2047 | |

It is seen from the table that each individual address range includes 200 addresses, with 400 addresses each allocated to audible ringing and busy tones respectively and 800 addresses allocated to dial tone. Two 4-bit counters are arranged to count the 159 ppf similar to the counters 5 and 6 in FIG. 1, however over the range of 200 addresses, that is from address 56 to address 255. The 4-bit counters are followed by a 2-bit counter which extends the total address range to 800.

One of the three tones is selected by tone address signals, from the associated switching facility. The tone address signals are used to provide the most significant bit of the address and to gate the outputs of the 2 bit counter to indicate in the resultant address one of the 400 address ranges or the 800 address range.

It should be noted in FIG. 1 the sequence of the samples stored in the ROM 10 in relation to the inherent characteristics of the TDM format permits the samples to relate directly to the normal progression of addresses. This is true if either 159 ppf or 161 ppf is applied to the counter 5. However, in the case of audible ringing, busy tone and dial tone generation, the samples are staggered with relation to the addresses. In the case of 159 counts per frame, the samples of a sequence are lodged 159 address locations apart. The following address allocation table illustrates 16 of the address storage locations for a 400 sample sequence of audible ringing, a 400 sample sequence of busy tone, and an 800 sample sequence of dial tone. The first sample is arbitrarily indicated as being stored at the first address for each of the audible tones.

| Sample No. | Addresses for Audible Ringing | Addresses for Busy Tone | Addresses for Dial Tone |
|---|---|---|---|
| 1 | 56 | 568 | 1080 |
| 2 | 215 | 727 | 1239 |
| 3 | 430 | 942 | 1454 |
| 4 | 133 | 645 | 1669 |
| 5 | 348 | 860 | 1884 |
| 6 | 507 | 1019 | 2043 |
| 7 | 210 | 722 | 1234 |
| 8 | 425 | 937 | 1449 |
| 9 | 128 | 640 | 1664 |
| 10 | 343 | 855 | 1879 |
| 11 | 502 | 1014 | 2038 |
| 12 | 205 | 717 | 1229 |
| 13 | 420 | 932 | 1444 |
| 14 | 123 | 635 | 1659 |
| 15 | 338 | 850 | 1874 |
| 16 | 497 | 1009 | 2033 |

The address locations for the samples are determined by adding 159 to each address to determine the next address. When the next address is found to lie in an area outside the permissible range as indicated in the ROM organization table, or has traversed that area, 56 is also added. In the case of audible ringing, when the sum exceeds 511 then 512 is subtracted to determine the next address. In the case of dial tone, when the sum exceeds 2047 then 1024 is subtracted to determine the next address. In the case of busy tone, when the sum of 1023 is exceeded then 512 is subtracted to determine the next address.

In similar fashion, single frequency tones for example a 480 Hz high tone, a 2600 Hz tone at −20 dBm and a 2600 Hz tone at −8 dBm can be generated. The high tone consists of a 50 sample sequence and each of the 2600 Hz tones consist of a 40 sample sequence.

In every case, it is preferable to have at least as many distinct samples in each sequence as there are channels available to receive samples during a TDM frame occurrence. This requirement is not met by the tone signal generator in FIG. 1 but as the sharing of samples of the same phase occurs at most between pairs of some of the TDM channels, the increase of crosstalk in associated analogue facilities is insignificant.

In every case it is also preferable to have more address occurrences than there are channels available to receive samples during a TDM frame occurrence. This provides that there are sufficient samples accessed that no one instant sample is directed to more than one channel. However, in an embodiment of the tone signal generator wherein samples are shared between a plurality of channels, substantial operational improvement is realized when compared to a system where all the channels are supplied with only a single sample of a tone sequence during a frame.

What is claimed is:

1. A digital tone signal generator for supplying a tone signal compatible with the frame and channel operating format of an associated time division multiplex (TDM) switching facility in a communication system, the generator comprising:

memory means for storing digital signal samples representing the tone signal at accessible locations;

access means responsive to timing signals from the switching facility and corresponding to the timing of the operating format, for accessing the memory means to cause signal samples representing at least two different phases of the tone signal to be read out from the memory means during the period of a frame in the operating format whereby different ones of a plurality of analog lines associated with a frame of said operating format may each receive a different phase of the tone being generated.

2. A digital tone signal generator as defined in claim 1, wherein the access means comprises an address generator for generating addresses in a repetitive sequence, a plurality of said addresses being generated during the period of each frame, said plurality of addresses corresponding in number to a dividend yielding other than a whole number quotient with a given divisor corresponding to the number of the digital signal samples and submultiples of same other than 1.

3. A digital tone signal generator as defined in claim 2, wherein the associated switching facility is a pulse code modulation (PCM) TDM switching facility, said memory means storing PCM signal samples representing a plurality of PCM tone signals, said memory means also being responsive to tone addresses from the associated switching facility whereby one of the plurality of PCM tone signals is selected.

4. A digital tone signal generator as defined in claim 2, wherein the address generator generates the addresses at a rate greater than the occurrence of channels for carrying said tone signal, whereby the occurrence of any one phase being carried by more than one channel is minimized.

5. A digital tone signal generator as defined in claim 4, wherein the associated switching facility is a pulse code modulation (PCM) TDM switching facility, said memory means storing PCM signal samples representing a plurality of PCM tone signals, said memory means also being responsive to tone addresses from the associated switching facility whereby one of the plurality of PCM tone signals is selected.

6. A digital tone signal generator as defined in claim 2, wherein the address generator comprises:

means responsive to the signals from the associated switching facility for generating clock pulses during each frame period corresponding in number to said plurality; and counter means responsive to the clock pulses for generating said addresses.

7. A digital tone signal generator for supplying binary signals in a sequence representing a pulse code modulation (PCM) tone to a plurality of time division multiplexed TDM channels in an associated switching facility having an operating format defined by a frame signal and a clock signal consisting of 320 pulses in the period of the frame signal, the generator comprising:

a clock generator responsive to the pulses of the clock signal and to the frame signal for generating a plurality of clock pulses during the period of the frame signal, said plurality of clock pulses corresponding in number to 320 or an integer submultiple of same, plus or minus one;

a counter for sequentially generating a series of addresses in response to the clock pulses from the clock pulse generator, the number of addresses in said series corresponding to the number of binary signals in said sequence; and a memory having said binary signals stored at address accessible locations therein, the memory unit being responsive to the addresses from the counter to read out the stored binary signals in the order of the sequence progressively with each occurrence of a given TDM channel whereby different ones of a plurality of analog lines associated with a frame of said operating format may each receive a different phase of the tone being generated.

8. A tone signal generator as defined in claim 7, wherein said memory has binary signal sequences stored therein, each of said sequences representing one of a family of PCM tones, the binary signals of each binary signal sequence being stored in a unique range of address accessible locations, the memory being responsive to tone addresses from the associated switching facility in combination with the addresses from the counter to read out the binary signals stored in a range according to the tone addresses.

9. A method for generating a tone signal compatible with the timing of a frame and channel operating format as represented by timing signals in an associated switching facility in a communication system, the method comprising the steps of:

(a) storing digital signal samples representing the tone signals at predetermined addresses in a memory means; and (b) generating a sequence of addresses in response to said timing signals, a plurality of said addresses being generated during the period of each frame, such that the accessed digital signal samples represent at least two different phases of the tone signal whereby different ones of a plurality of analog lines associated with a frame of said operating format may each receive a different phase of the tone being generated.

10. A method as defined in claim 9, wherein the plurality of said addresses being generated during the period of each frame corresponds in number to a dividend yielding other than a whole number quotient with a given divisor corresponding to the number of digital signal samples and submultiples of same other than 1.

* * * * *